United States Patent [19]

Yoshino et al.

[11] Patent Number: 5,261,475
[45] Date of Patent: Nov. 16, 1993

[54] OFF-THE-ROAD PNEUMATIC STEEL RADIAL TIRES

[75] Inventors: Satoshi Yoshino, Mitaka; Tetsuhiko Sato, Kodaira; Minoru Nakano, Koganei, all of Japan

[73] Assignee: Bridgestone Corporation, Tokyo, Japan

[21] Appl. No.: 727,180

[22] Filed: Jul. 9, 1991

[30] Foreign Application Priority Data

Dec. 18, 1990 [JP] Japan .................. 2-411283

[51] Int. Cl.[5] .................. B60C 9/18; B60C 9/20
[52] U.S. Cl. .................. 152/527; 152/526; 152/534; 152/535
[58] Field of Search .................. 152/526, 527, 534–535

[56] References Cited

U.S. PATENT DOCUMENTS

| | | | |
|---|---|---|---|
| 3,625,272 | 12/1971 | Fletcher | 152/534 X |
| 4,169,495 | 10/1979 | Maiocchi | 152/527 |
| 4,172,487 | 10/1979 | Suzuki et al. | 152/535 X |
| 4,235,274 | 11/1980 | Suzuki et al. | 152/527 |
| 4,293,019 | 10/1981 | Maiocchi . | |
| 4,407,347 | 10/1983 | Mirtain . | |
| 4,446,905 | 5/1984 | Tamura et al. . | |
| 4,526,217 | 7/1985 | Maeda et al. . | |
| 4,702,293 | 10/1987 | Iwata et al. | 152/535 X |
| 4,742,858 | 5/1988 | Takahira | 152/526 X |
| 5,027,877 | 7/1991 | Tamura et al. | 152/527 |

FOREIGN PATENT DOCUMENTS

62-8801 1/1987 Japan .

OTHER PUBLICATIONS

"Mechanics of Pneumatic Tires", U.S. Dept. of Transportation, Aug. 1981, pp. 219–220.

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

An off-the-road pneumatic steel radial tire comprises a radial carcass comprised of at least one carcass ply containing steel cords and a belt superimposed about a crown portion of the carcass and comprised of at least three laminated steel cord layers. In this tire, the belt includes at least two main belt layers each containing substantially inextensible steel cords, in which steel cords included in at least one of these main belt layers satisfy conditions that a cord diameter is. the same in this layer but different from that of the remaining main belt layer, and a ratio of cord diameter in these main belt layers is within a range of 1.2–3.0, and a ratio of total breaking load of cords in these main belt layers per unit width is within a range of 1.1–2.0 times.

7 Claims, 4 Drawing Sheets

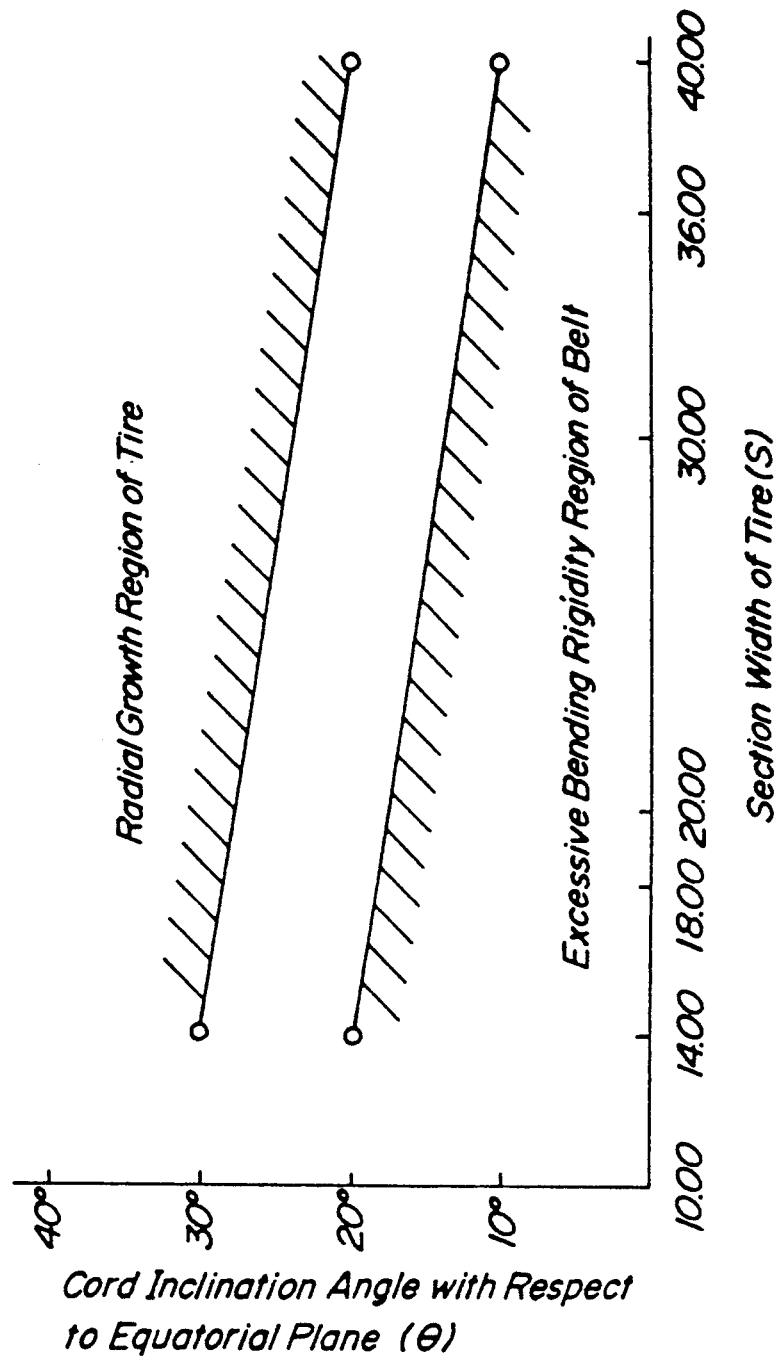

FIG_3a
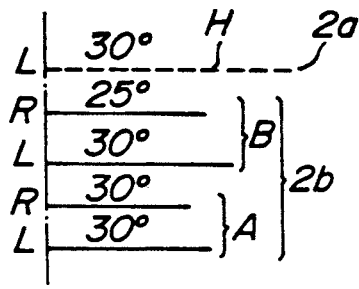
FIG_3b
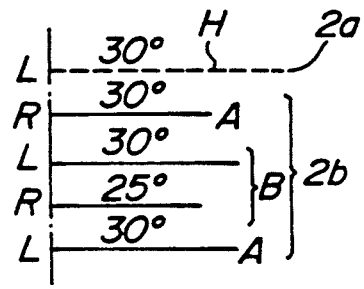
FIG_3c
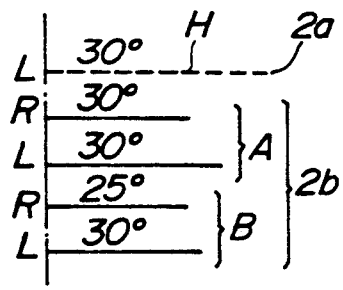
FIG_3d
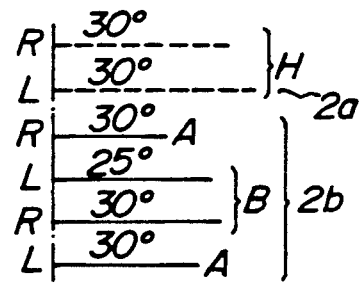
FIG_3e
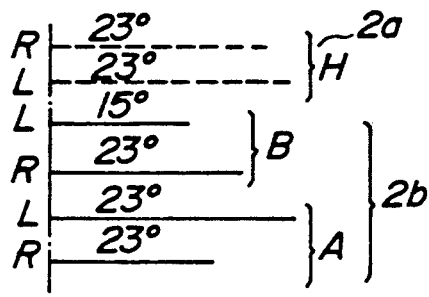

OFF-THE-ROAD PNEUMATIC STEEL RADIAL TIRES

BACKGROUND OF THE INVENTION

1. Field of the Invention

This invention relates to off-the-road pneumatic steel radial tires. More particularly to an off-the-road pneumatic steel radial tire having an improved cut resistance which can economically realize the effective prevention of passing cut failure caused in the tire tread through the belt during the running on a rough road.

2. Related Art Statement

Since large size construction machines, equipment and the like to be carried or run itself substantially pass on rough road or off-road conditions, so-called off-the-road tires (OR tire) are mainly used.

Moreover, stumps after the felling of trees, rocks or their broken lumps are scattered on such off-the-road conditions, so that they result in the occurrence of cut failure in the tire tread to decrease the durably life thereof. If such a cut failure passes through the belt as a reinforcing member for the tread rubber layer, the bearing of load by the tire is lost resulting in loss of operation of the construction machine or the like. As a result, the time required for replacing with a new tire becomes considerably long because the footing site is bad and the carrying capacity is large.

In general, this type of OR tire comprises a carcass comprised of at least one carcass ply usually containing steel cords and a belt superimposed about a crown portion of the carcass and comprised of plural belt layers each containing steel cords. In this case, the belt serves as a reinforcing member for the tread rubber layer.

For the belt, there are frequently co-used a main belt layer composed of inextensible steel cords and a protective belt layer enveloping the main belt layer and using high-elongation steel cords for enhancing the enveloping property of the tread. Irrespective of such a co-use, in order to improve the cut resistance of the belt, there have hitherto been taken a countermeasure of increasing the number of the belt layers to be laminated, a countermeasure of increasing the diameter of steel cord and the like.

In any case, however, the cost is undesirably increased, and also the heat generation becomes large during running. As a result, a fear of causing troubles due to heat separation ca not be overlooked.

SUMMARY OF THE INVENTION

It is, therefore, an object of the invention to provide an off-the-road pneumatic steel radial tire having a useful belt reinforcing structure without causing drawbacks accompanied with the aforementioned conventional countermeasures for the enhancement of cut resistance and without a fear of increasing the cost in the tire and creating the heat generation.

According to the invention, there is the provision of an off-the-road pneumatic steel radial tire comprising a carcass comprised of at least one carcass ply of radial structure containing steel cords as a reinforcing member for tire casing and a belt superimposed about a crown portion of the carcass as a reinforcing member for tread rubber layer and comprised of at least three laminated steel cord layers, the steel cords of which layers being crossed with each other, characterized in that said belt includes at least two main belt layers each containing substantially inextensible steel cords therein and steel cords included in at least one of these main belt layers satisfy conditions that a cord diameter is the same in this layer but different from that of the remaining main belt layer, and a ratio of cord diameter in these main belt layers is within a range of 1.2–3.0, and a ratio of total breaking load of cords in these main belt layers per unit width is within a range of 1.1–2.0 times. In preferred embodiments of the invention a section width of the tire ranges from 14.00–40.00 inches and an inclination angle of large size cords int he main belt layers with respect to an equatorial plane of the tire ranges from 20°–30° for a section width of 14.00 inches and from 10°–20° for a section width of 40.00 inches, the upper and lower limits of the inclination angle ranges decreasing linearly with increasing section width, and further at least one layer of the belt surrounding about the main belt layers is at least one protective belt layer comprised of high-elongaton steel cords.

BRIEF DESCRIPTION OF THE DRAWINGS

The invention will be described with reference to the accompanying drawings, wherein:

FIG. 2 is a graph showing an interrelation between section width of the tire and cord angle in the belt;

FIGS. 3a to 3e are schematic views of belt layers according to the invention, respectively.

DESCRIPTION OF THE PREFERRED EMBODIMENTS

Figure 1:
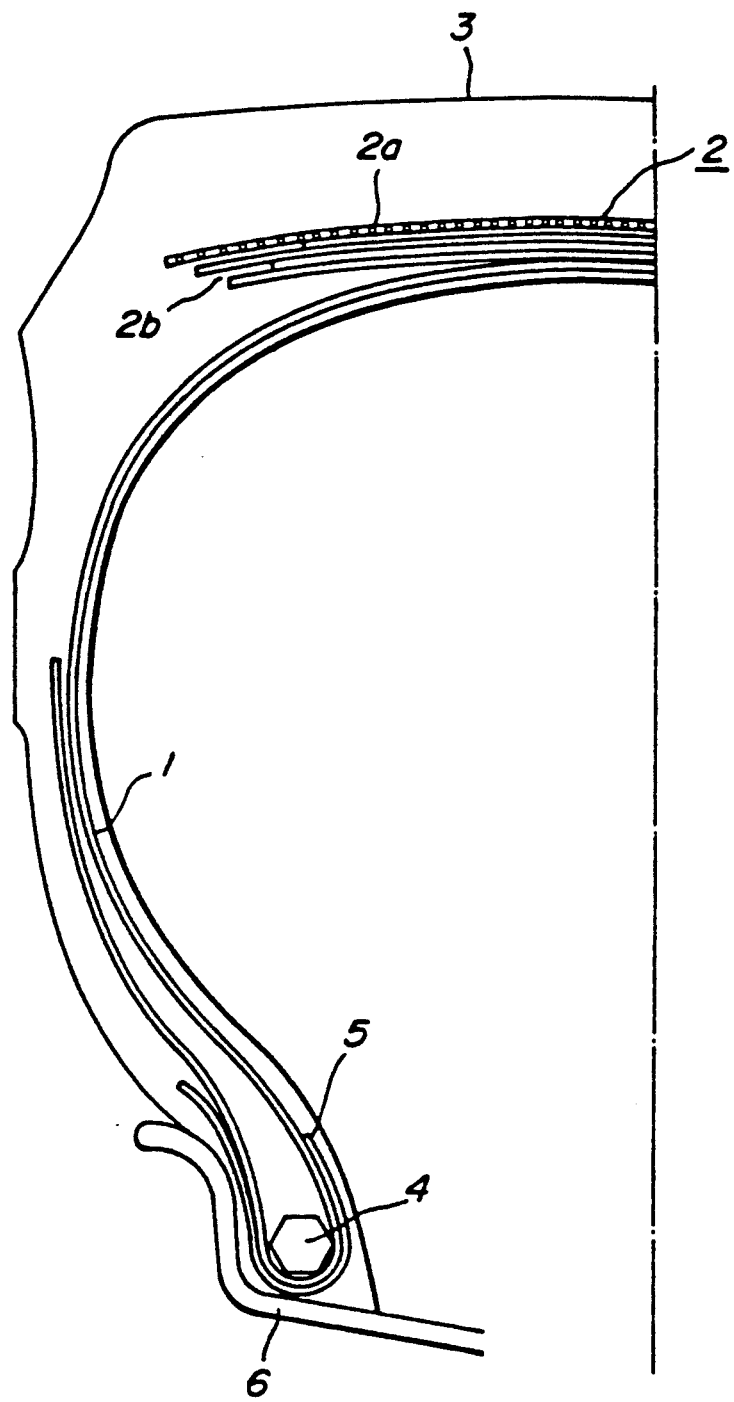
FIG. 1 is a sectional view of an embodiment of the tire according to the invention.

In FIG. 1 is sectionally shown a left half of an off-the-road pneumatic steel radial tire according to the invention, in which numeral 1 is a carcass, numeral 2 a belt, numeral 3 a tread rubber layer, numeral 4 a bead core, numeral 5 a chafer and numeral 6 a rim.

In such a steel radial tire having a relatively small size such as ORR 18.00 R25, the carcass 1 is comprised of at least one carcass ply using steel cords each having a twisting structure of $1 \times 3 + 9 + 15 + 1$, a cord diameter of 1.41 mm and a breaking load of 280 kg. The belt is comprised of at least one protective belt layer 2a, e.g. one protective belt layer as an outermost layer in the illustrated embodiment, containing high-elongation steel cords each having a twisting structure of $3 \times 7$, a cord diameter of 1.61 mm and a breaking load of 170 kg. At least one main belt layer 2b, e.g. four main belt layers in the illustrated embodiment, contain substantially inextensible steel cords. In these main belt layers 2b, the diameters of the steel cords are the same in the same layer but different from those of the other layer. For example, the large diameter cord has a twisting structure of $7 \times 7 + 1$, a cord diameter of 1.89 mm and a breaking load of 400 kg, while the small diameter cord has a twisting structure of $1 \times 3 + 9 + 15 + 1$, a cord diameter of 1.41 mm and a breaking load of about 280 kg. These main belt layers are laminated to cross the steel cords of the layers with each other at a certain cord inclination angle with respect to the equatorial plane of the tire. Among the four main belt layers, at least one main belt layer is comprised of large diameter steel cords and has a cord inclination angle of 18°–28° with respect to the equatorial plane. Each of the remaining main belt layers has a cord inclination angle of 25°–40°.

In the tire having a super large size such as ORR 36.00 R51, the carcass 1 is comprised of at least one carcass ply containing steel cords each having a twisting structure of $1\times(3+9+15)+6\times(3+9+15)+1$, a cord diameter of 3.2 mm and a breaking load of 1130 kg. The belt 2 is comprised of the same protective belt layer 2a as mentioned above and four main belt layers 2b. In this case, the large diameter inextensible cord has a twisting structure of $1\times(3+9+15)+6\times(3+9+15)+1$, a cord diameter of 4.43 mm and a breaking load of 1950 kg. The small diameter inextensible cord has a twisting structure of $7\times7+1$, a cord diameter of 2.25 mm and a breaking load of about 555 kg. These main belt layers are laminated to cross the steel cords of the layers with each other at a certain cord inclination angle with respect to the equatorial plane of the tire. Among the four main belt layers, at least one main belt layer is comprised of large diameter steel cords and has a cord inclination angle of 12°-22° with respect to the equatorial plane, and each of the remaining main belt layers has a cord inclination angle of 15°-30°.

In order to ensure the cut resistance of the belt, the inventors have made various experiments and examinations and found the following facts. As a factor contributing to the cut resistance of the belt, there are mentioned the bending rigidity of the belt, the breaking load of steel cord used in the belt and the total breaking load of cords per unit width of the belt.

Firstly, the bending rigidity of the belt affects an easiness of deformation when the tire tread rides on protrusions such as rocks and the like scattered on road surface or a so-called enveloping property, so that it is advantageous to make the bending rigidity small. For this purpose, it is advantageous to reduce the number of the belt layers to be laminated, decrease the diameter of the steel cord used in the belt layer, or make the inclination angle of the steel cord with respect to the equatorial plane large.

However, the inclination angle of the steel cord is required to be selected from a balance of the other performances, for example, the resistance to separation at belt end. In the OR steel radial tire having a relatively small size such as 18.00 R25, even if the cord inclination angle is made large with respect to the equatorial plane, the strain at the belt end is not so high. On the other hand, in the steel radial tire having a large size such as 36.00 R51, the tread width is wide and hence the belt width is wide. If the cord inclination angle is the same as in the small size tire, the tension bearing of the belt is insufficient in the inflation under internal pressure and the radial growth of the tread becomes large (the curvature of radius of the tread becomes small), and finally the increase of strain at the belt end is caused in the contacting with ground. As a result, the separation failure is caused at the belt end, and also the ground contacting pressure becomes higher at the central portion of the tread to lose the cut resistance at this portion.

As seen from the above, it is required that the cord inclination angle with respect to the equatorial plane in the large size tire is set to a value smaller than that in the small size tire.

That is, it is preferable that the small-diameter cord inclination angle in the belt is 25°-40° in the small size OR steel radial tire and 15°-30° in the large size OR steel radial tire.

According to the invention, it is required that the inclination angle of large diameter steel cords constituting at least one main belt layer among the main belt layers with respect to the equatorial plane of the tire is gradually reduced from a range of 20°-30° toward a range of 10°-20° as the section width of the tire becomes large as shown in FIG. 2. When the cord inclination angle is too large, the drawbacks due to the radial growth of the tire are caused, while when it is too small, the drawbacks due to the excessive bending rigidity of the belt are caused.

Secondly, the breaking load of the cord determines the cut of the steel cord when a sharp edge of broken rock piece approaches from cut failure produced in the tread into the tread rubber layer. In this connection, the inventors have made various experiments and found from the results of various experiments on various lamination structures that the interrelation to the cord diameter is strong but the cut of the cord is depended upon the main belt layer of maximum cord diameter among the main belt layers using inextensible steel cords.

Furthermore, it has been found that the effect is less when the ratio of total breaking load of cords in the main belt layer containing maximum cord diameter to another main belt layer is 1 per unit width of the layer and when such a ratio is within a range of 1-2.0, preferably 1.15-1.80, the conspicuous effect is obtained.

That is, the breaking of the main belt layer in the belt is not dependent upon the average breaking load of these main belt layers but is dependent upon the breaking load of steel cord in the main belt layer having the largest cord diameter and the total breaking load of cords in such a main belt layer per unit width.

From such experimental results, the cut resistance of the belt in the OR tires can be summarized as follows.

If it is intended to reduce the cost while maintaining the cut resistance of the belt at the same level as in existing tires, it is advantageous that at least one main belt layer among the main belt layers is comprised of steel cords having the same cord diameter as in the existing tire and the cord diameter in the other remaining main belt layers is made small. Thus the bending rigidity of the belt is decreased with the decrease of the cost without the actual decrease of the breaking load and the cut resistance of the belt is at least made equal to that of the existing tire.

If it is intended to control the increase of the cost at minimum by improving the cut resistance of the belt, at least one main belt layer among the main belt layers in the existing tire is comprised of steel cords having a cord diameter larger than that in the existing tire and the ratio of total breaking load of large diameter cords to that of the cords having the same cord diameter as in the existing tire per unit width is made somewhat large, whereby the cut resistance of the belt is considerably improved without actually increasing the bending rigidity of the belt.

In the latter case, the effect is developed when the layer containing large diameter cords is only one, but it is more preferable that two layers containing large diameter cords are used to cross the cords of these layers with each other though the bending rigidity is somewhat increased considering the fact that the cutting direction is random.

According to the invention, the reason why the ratio of cord diameter in the large diameter cord to small diameter cord is limited to a range of 1.2-3.0 is due to the fact that when the ratio is less than 1.2, the sufficient cut resistance is not obtained. When it exceeds 3.0, the total tire performance such as resistance to belt separation, wear resistance of tread and the like are degraded.

Furthermore, the reason why the ratio of total breaking load of cords in the layer containing large diameter cords to the layer containing small diameter cords per unit width is limited to a range of 1.1-2.0 times is due to the fact that when such a ratio is less than 1.1, the remarkable effect on the improvement of cut resistance is not obtained. When it exceeds 2.0, the end count of large diameter cords is too dense and the separation failure is apt to be caused. Moreover the inclination angle of the large diameter cord constituting the main belt layer in the belt 2 is 20°-30°, preferably 25°-30° in the small size tire of 18.00 R25 or less and 10°-20°, preferably 15°-20° in the large size tire of 30.00 R51 or more considering (1) the size range of OR tire is largely scattered as compared with the other tire groups and (2) the inclination angle suitable for the improvement of cut resistance is existent in accordance with the tire size. In the large size OR tire, it is favorable to use a main belt layer containing large diameter cords as only one layer for controlling the radial growth of the tire and it is desirable that the width of the main belt layer containing large diameter cords is minimum among the main belt layers.

The following examples are given in illustration of the invention and are not intended as limitations thereof.

EXAMPLE 1

Figure 4A:
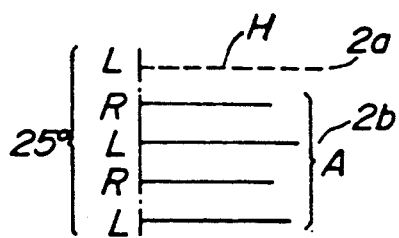
FIGS. 4a to 4d are schematic views showing conventional belt laminating structures, respectively.
Figure 4B:
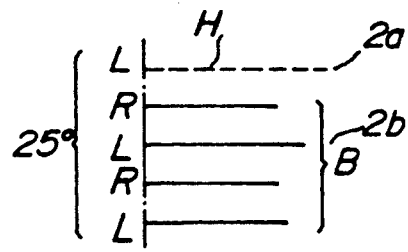
Figure 4C:
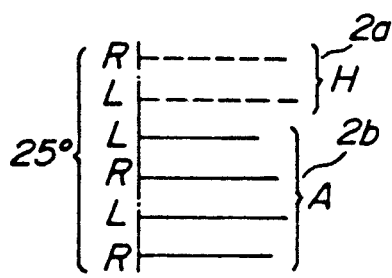

Test tires 1-4 according to the invention having a tire size of ORR 18.00 R25, a tread class E4 (TRA standard) and a structure in section as shown in FIG. 1 were prepared so as to have a belt lamination structure as shown in FIGS. 3a to 3d. These test tires were subjected to a cut test for the tread together with a conventional tire and comparative tires 1, 2 (whose belt lamination structure is shown in FIGS. 4a to 4c) to obtain results as shown in the following Table 1.

C: high-elongation cord having a twisting structure of 3×7, a filament diameter of 1.61 mm, a breaking load of 170 kg and an end count of 13 cords/5 cm The cut test for the tread was carried out by mounting the tire onto a rim, inflating it under a given internal pressure, and pushing down a wedge-like pushing member having an acute (60°) and slightly round chamfered edge onto the surface of the tread rubber layer 3 of the tire, during which a load causing the breakage of the belt was measured. The breaking load was represented by an index on the basis that the conventional tire was 100.

As seen from the data of Table 1, in Comparative Example 1 in which all of the main belt layers 2b consist of large diameter steel cords as a countermeasure for the conventional tire, the breaking load index is fairly improved, but the bending rigidity of the belt increases and hence the enveloping property is degraded and the cord cost is undesirably increased. On the other hand, in Comparative Example 2 in which the number of the protective belt layers 2a is 2, the breaking load index can not effectively be improved. On the contrary, when the small diameter cord A and large diameter cord B are used together in such a manner that cord diameter is the same in the same layer but is different between the layers according to the invention, the breaking load index is considerably improved without the considerable increase of the cord cost under a condition that the number of large diameter cords used is fairly smaller than that of Comparative Example 1.

EXAMPLE 2

A test tire according to the invention having a tire size of ORR 36.00 R51 and a tread class E4 (TRA standard) was prepared to have a belt lamination structure as shown in FIGS. 3e according to the following points:
A: small diameter cord having a twisting structure of 7×7+1, a filament diameter of 2.25 mm, a breaking load of 555 kg and an end count of 17.2 cords/5 cm.

TABLE 1

|  | Number of belt layers | Main belt layer | | Protective belt layer | | Index of breaking load |
| --- | --- | --- | --- | --- | --- | --- |
|  |  | Number | Kind of cord | Number | Kind of cord |  |
| Acceptable Example |  |  |  |  |  |  |
| 1 (FIG. 3a) | 5 | 4 | $A_L$-$A_R$-$B_L$-$B'_R$ | 1 | $H_L$ | 120 |
| 2 (FIG. 3b) | 5 | 4 | $A_L$-$B'_R$-$B_L$-$A_R$ | 1 | $H_L$ | 140 |
| 3 (FIG. 3c) | 5 | 4 | $B_L$-$B'_R$-$A_L$-$A_R$ | 1 | $H_L$ | 125 |
| 4 (FIG. 3d) | 6 | 4 | $A_L$-$B_R$-$B'_L$-$A_R$ | 2 | $H_L$-$H_R$ | 135 |
| Conventional tire (FIG. 4a) | 5 | 4 | $A'_L$-$A'_R$-$A'_L$-$A'_R$ | 1 | $H_L$ | 100 |
| Comparative Example |  |  |  |  |  |  |
| 1 (FIG. 4b) | 5 | 4 | $B'_L$-$B'_R$-$B'_L$-$B'_R$ | 1 | $H_L$ | 120 |
| 2 (FIG. 4c) | 6 | 4 | $A'_R$-$A'_L$-$A'_R$-$A'_L$ | 2 | $H_L$-$H_R$ | 115 |

Note)
The kind of cord in the laminated belt layers is shown as follows. Moreover, cord with suffix L is upward to the left and a cord angle of 30° and cord with suffix R is upward to the right at the same cord angle and cord with a prime has a cord angle of 25°.

The kind of cord in the laminated layers shown in Table 1 is classified as follows:
A: small diameter cord having a twisting structure of 1×3+9+15+1, a filament diameter of 1.41 mm, a breaking load of 280 kg and an end count of 18.6 cords/5 cm
B: large diameter cord having a twisting structure of 7×7+1, a filament diameter of 1.89 mm, a breaking load of 4000 kg, an end count of 15.5 cords/5 cm and a breaking load ratio of 1.19 per unit width B: large diameter cord having a twisting structure of 1×(3+9+15)+6×(3+9+15)+1, a filament diameter of 4.43 mm, a breaking load of 1950 kg, an end count of 8.6 cords/5 cm and a breaking load ratio of about 1.76 per unit width
C: high-elongation cord having a twisting structure of 3×7, a filament diameter of 1.61 mm, a breaking load of 170 kg and an end count of 13 cords/5 cm

|  | Kind of cord | Width (mm) | Angle (°) |
| --- | --- | --- | --- |
| First layer | A | 510 | 23 |
| Second layer | A | 600 | 23 |
| Third layer | B | 550 | 23 |
| Fourth layer | B | 470 | 15 |
| Fifth layer | H | 670 | 23 |
| Sixth layer | H | 620 | 23 |

Figure 4D:
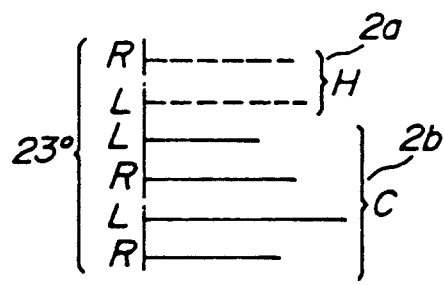

For the comparison, a conventional test tire was prepared in the same manner as in Example 2 except that each of the first to fourth main belt layers in the belt 2 as shown in FIG. 4d was comprised of steel cords having a twisting structure of $1 \times (3+9+15) + 6 \times (3+9+15) + 1$, a filament diameter of 3.2 mm and a breaking load of 1130 kg at an end count of 11.7 cords/5 cm and the total breaking load of the main belt layers was approximately equal to that of Example 2.

These two test tires were tested under the same conditions as in Example 1 and consequently the breaking load index of the test tire was 125 on the basis that the breaking load index of the comparative test tire was 100.

Although the above results were shown with respect to a case that the belt in each example was provided with the protective belt layer 2a, it has been confirmed that the invention can contribute to improve the cut resistance of the belt even if the belt is not provided with the protective belt layer.

According to the invention, the cut resistance of the belt can advantageously be satisfied by using a few number of large diameter steel cord layer as a main belt layer of the belt without remarkably increasing the cord coating.

What is claimed is:

1. An off-the-road pneumatic steel radial tire comprising; a carcass comprising at least one carcass ply of radial structure containing steel cords as a reinforcing member for a tire casing, a belt superimposed about a crown portion of the carcass as a reinforcing member for a tread rubber layer and having two large-diameter steel cord layers and two small-diameter steel cord layers each containing substantially inextensible steel cords therein, the steel cords of which layers being crossed with each other, and at least one protective belt layer superimposed about the belt and containing high-elongation steel cords therein, wherein said belt satisfies the following conditions, said two large-diameter steel cord layers are adjacent to each other, a ratio of cord diameter of said large-diameter steel cord layers to cord diameter of said small-diameter steel cord layers is within a range of 1.2–3.0, and a ratio of total breaking load of cords in said large-diameter steel cord layers to total braking load of cords in said small-diameter steel cord layers per unit width is within a range of 1.1–2.0 times.

2. An off-the-road pneumatic steel radial tire according to claim 1, wherein an inclination angle of large diameter cords in the belt layers with respect to an equatorial plane of the tire ranges from 20° to 30° for a section width of the tire of 14.00 inches and from 10° to 20° for a section width of 40.00 inches.

3. An off-the-road pneumatic steel radial tire according to claim 2, wherein the inclination angle of large diameter cords in the belt layers is equal to or smaller than that of the small diameter cords in the belt layers.

4. The off-the-road pneumatic steel radial tire according to claim 1, wherein said tire is a small size off-the-road steel radial tire and said small diameter cords in the belt have a breaking load of about 280 kg.

5. An off-the-road pneumatic steel radial tire according to claim 1, wherein said tire is a large size off-the-road steel radial tire and said small diameter cords in the belt have a breaking load of about 555 kg.

6. An off-the-road pneumatic steel radial tire according to claim 1, wherein said tire is a small size off-the-road steel radial tire and the inclination angles of the small-diameter steel cords in said belt is in the range of 25°–40°.

7. An off-the-road pneumatic steel radial tire according to claim 1, wherein said tire is a large size off-the-road steel radial tire and the inclination angles of the small-diameter steel cords in said belt are in the range of 15°–30°.

* * * * *